(12) United States Patent
Jang et al.

(10) Patent No.: US 11,492,061 B2
(45) Date of Patent: Nov. 8, 2022

(54) HANDLE PROTECTION DEVICE FOR PERSONAL MOBILITY

(71) Applicants: Hyundai Motor Company, Seoul (KR); Kia Corporation, Seoul (KR)

(72) Inventors: Yocheol Jang, Suwon-Si (KR); Donghee Seok, Suwon-Si (KR); Duck Young Kim, Seongnam-Si (KR); Ilsun Song, Seongnam-Si (KR); Hee Jin Ro, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/405,883

(22) Filed: Aug. 18, 2021

(65) Prior Publication Data
US 2022/0161883 A1    May 26, 2022

(30) Foreign Application Priority Data

Nov. 26, 2020 (KR) .......................... 10-2020-0161646

(51) Int. Cl.
*B62J 23/00* (2006.01)
*B62K 21/26* (2006.01)

(52) U.S. Cl.
CPC ............... *B62J 23/00* (2013.01); *B62K 21/26* (2013.01)

(58) Field of Classification Search
CPC .................................. B62J 23/00; B62K 21/26
See application file for complete search history.

(56) References Cited

U.S. PATENT DOCUMENTS

| | | | |
|---|---|---|---|
| 5,740,700 A * | 4/1998 | Redmond | B62J 23/00 74/551.8 |
| 2015/0329162 A1* | 11/2015 | Small, Jr. | F16B 2/08 74/551.8 |
| 2016/0137248 A1* | 5/2016 | Garrett | B62J 23/00 74/551.8 |

* cited by examiner

*Primary Examiner* — Vicky A Johnson
(74) *Attorney, Agent, or Firm* — Morgan, Lewis & Bockius LLP

(57) ABSTRACT

A handle protection device configured for a personal mobility, which is mounted on an upper end portion of a steering shaft may include a handle member disposed with a grip portion at opposite sides of the handle member, includes a first protection member mounted on an external surface of the handle member between the grip portion and the steering shaft, a protection cover configured to enclose and accommodate the grip portion and one or more components provided on the grip portion and including a coupling end portion at a first end portion of the protection cover and detachably coupled to the first protection member and an opening through which a hand of a user enters and exits, and a second protection member fixed to a second end portion of the protection cover opposite to the coupling end portion.

19 Claims, 10 Drawing Sheets

HANDLE PROTECTION DEVICE FOR PERSONAL MOBILITY

CROSS-REFERENCE TO RELATED APPLICATION(S)

The present application claims priority to Korean Patent Application No. 10-2020-0161646, filed on Nov. 26, 2020, in the Korean Intellectual Property Office, the entire contents of which is incorporated herein for all purposes by this reference.

BACKGROUND OF THE INVENTION

Field of the Invention

The present invention relates to a handle protection device for a personal mobility mounted on a handle member of a personal mobility.

Description of Related Art

As used throughout this application, the phrase "personal mobility" is intended to mean any moving personal vehicle, device, machine, instrument, apparatus, or the like. Recently, the use of a personal mobility such as an electric kickboard, an electric wheel, and an electric bicycle is expanding. The personal mobility may drive on roadways, sidewalks, narrow alleys, and the like by electric power, and may be used as a means of transportation or leisure for moving a short distance.

A brake lever, an operation switch, and the like are provided on a handle member of a personal mobility.

However, in this personal mobility, because the brake lever and the operation switch are provided at opposite end portions of the handle member, the brake lever and the operation switch may be easily damaged when the personal mobility falls downwards. In addition, the personal mobility is inconvenient to use in winter because the hands of a user are exposed to cold outside air.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a handle protection device configured for a personal mobility configured for protecting components mounted on a handle member.

Various aspects of the present invention are directed to providing a handle protection device configured for a personal mobility configured for protecting the hands of a user from injury or cold outside air.

Additional aspects of the present invention will be set forth in portion in the description which follows, and in part, will be obvious from the description, or may be learned by practice of the present invention.

In accordance with an aspect of the present invention, a handle protection device configured for a personal mobility, which is mounted on an upper end portion of a steering shaft and includes a handle member provided with a grip portion at opposite sides of the handle member, includes a first protection member mounted on an external surface of the handle member between the grip portion and the steering shaft, a protection cover configured to enclose and accommodate the grip portion and one or more components provided on the grip portion and including a coupling end portion at a first end portion of the protection cover and detachably coupled to the first protection member and an opening through which a hand of a user enters and exits, and a second protection member fixed to a second end portion of the protection cover opposite to the coupling end portion.

The first protection member and the second protection member may be made of a metal material to which a magnet is attached and may be provided in a shape of a disk or a cylinder having a radius greater than a height at which the components protrude from the grip portion.

The protection cover may be provided in a cylindrical telescopic type in which the protection cover is foldable toward the second protection member to be shortened in length or unfoldable from the second protection member to be lengthened in the length.

The second protection member may include an accommodating groove to accommodate a portion of the protection cover when the protection cover is folded.

The coupling end portion may include a magnet ring selectively attachable to the first protection member or the second protection member.

The coupling end portion may include a metal support ring to support an internal surface of the magnet ring.

The protection cover may be provided in a cylindrical corrugated tube type in which the protection cover is foldable toward the second protection member to be shortened in length or unfoldable from the second protection member to be lengthened in the length.

The coupling end portion may include a plurality of magnet projections protruding toward an external surface of the protection cover, the first protection member may include a first accommodating groove to accommodate the coupling end portion and a plurality of first coupling grooves formed on an internal surface of a circumference of the first accommodating groove so that the plurality of magnet protrusions is correspondingly coupled thereto, and the second protection member may include a second accommodating groove to accommodate the protection cover in a folded state of the protection cover and a plurality of second coupling grooves formed on an internal surface of a circumference of the second accommodating groove so that the plurality of magnet protrusions is correspondingly coupled thereto when the protection cover is folded.

The plurality of first coupling grooves may be formed in a number greater than a number of the magnet protrusions to change a coupling position of the protection cover.

The protection cover may include reinforcing coating layers to reinforce peak portions of an external surface of the protection cover.

The protection cover may be provided such that an external surface thereof is inclined at with respect to an axis of the grip portion so that an end portion of the protection cover coupled to the second protection member is located further away from grip portion than the coupling end portion.

The protection cover may include one or more drain holes formed on a lower side thereof.

The handle protection device may further include a heater provided the first protection member to heat an internal space of the protection cover.

The handle protection device may further include at least a sterilization lamp provided in the first protection member to sterilize an internal space of the protection cover.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
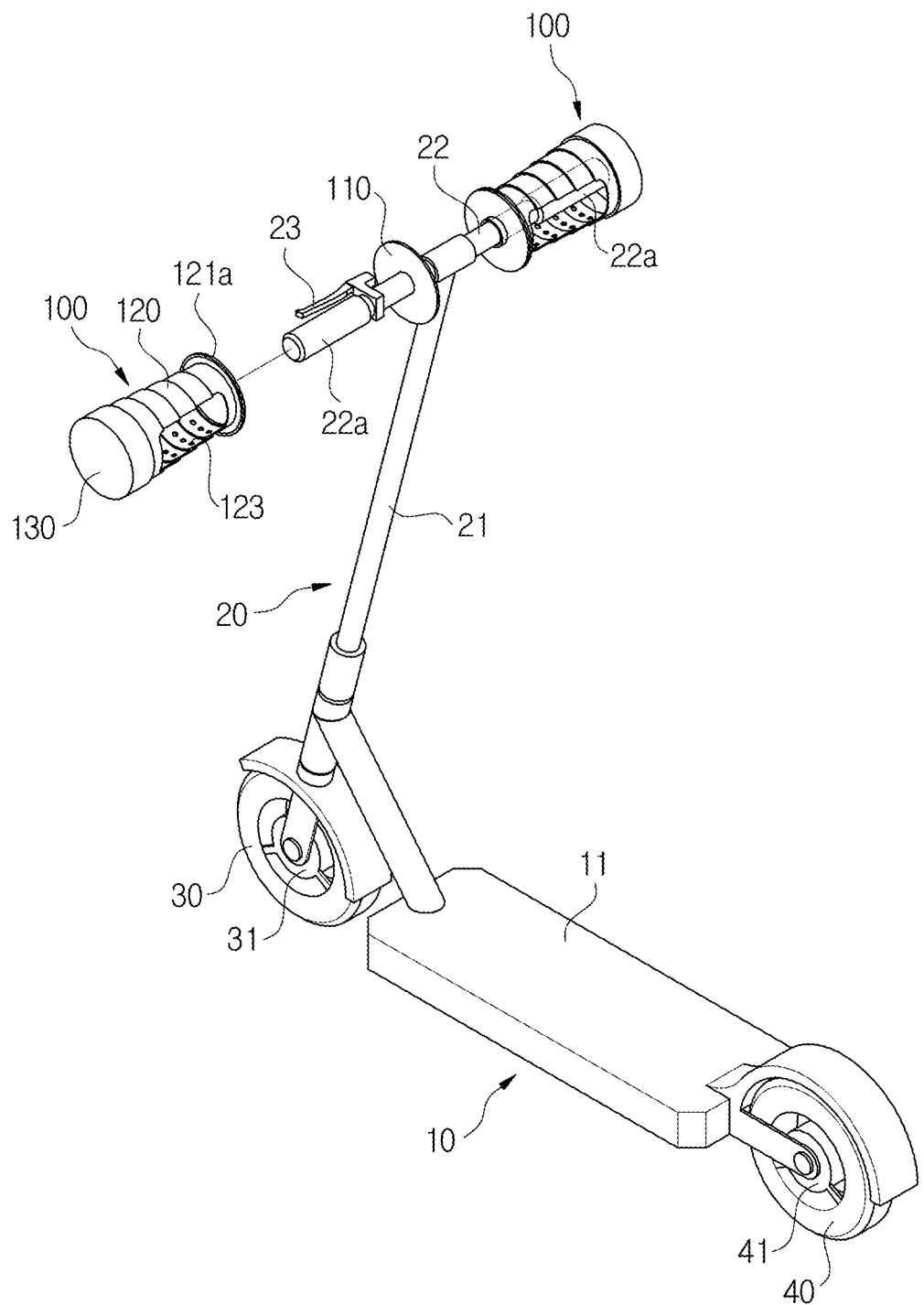
FIG. 1 illustrates a personal mobility to which a handle protection device according to various exemplary embodiments of the present invention is applied.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter embodiments of the present invention will be described in detail with reference to the accompanying drawings. The exemplary embodiments described below are provided by way of example so that those skilled in the art will be able to fully understand the spirit of the present invention. The present invention is not limited to the exemplary embodiments described below, but may be embodied in other forms. To clearly explain various exemplary embodiments of the present invention, parts not related to the description are omitted from the drawings, and the width, length, thickness, etc. of the components may be exaggerated for convenience.

Referring to FIG. 1, a personal mobility, to which a handle protection device according to various exemplary embodiments of the present invention is applied, may include a main body 10 provided with a footrest 11 on an upper end portion thereof, a steering device 20 provided in front of the main body 10, a front wheel 30 provided at a lower end portion of the steering device 20, and a rear wheel 40 provided at a rear end portion of the main body 10.

The front wheel 30 and the rear wheel 40 may include driving motors 31 and 41 for driving and braking devices for braking, respectively. The main body 10 may include a battery for supplying electric power to the driving motors 31 and 41 of the front wheel 30 and the rear wheel 40.

The steering device 20 includes a steering shaft 21 rotatably provided at a front end portion of the main body 10, and a handle member 22 connected to an upper end portion of the steering shaft 21 and provided with a grip portion at opposite sides. An operation member configured for controlling driving and a brake lever 23 configured for controlling braking may be provided on any one end portion of the grip portion of the handle member 22.

The handle protection device 100 according to various exemplary embodiments of the present invention may be configured to cover each of the grip portions 22a of the opposite end portions of the handle member 22 to protect components such as the operation member and brake lever 23 provided on the handle member 22 and at the same time to protect the hands of a user from injury or cold outside air. The handle protection device 100 may be applied not only to an electric kickboard as illustrated in FIG. 1 but also to a personal mobility such as an electric bicycle and an electric scooter.

Figure 2:
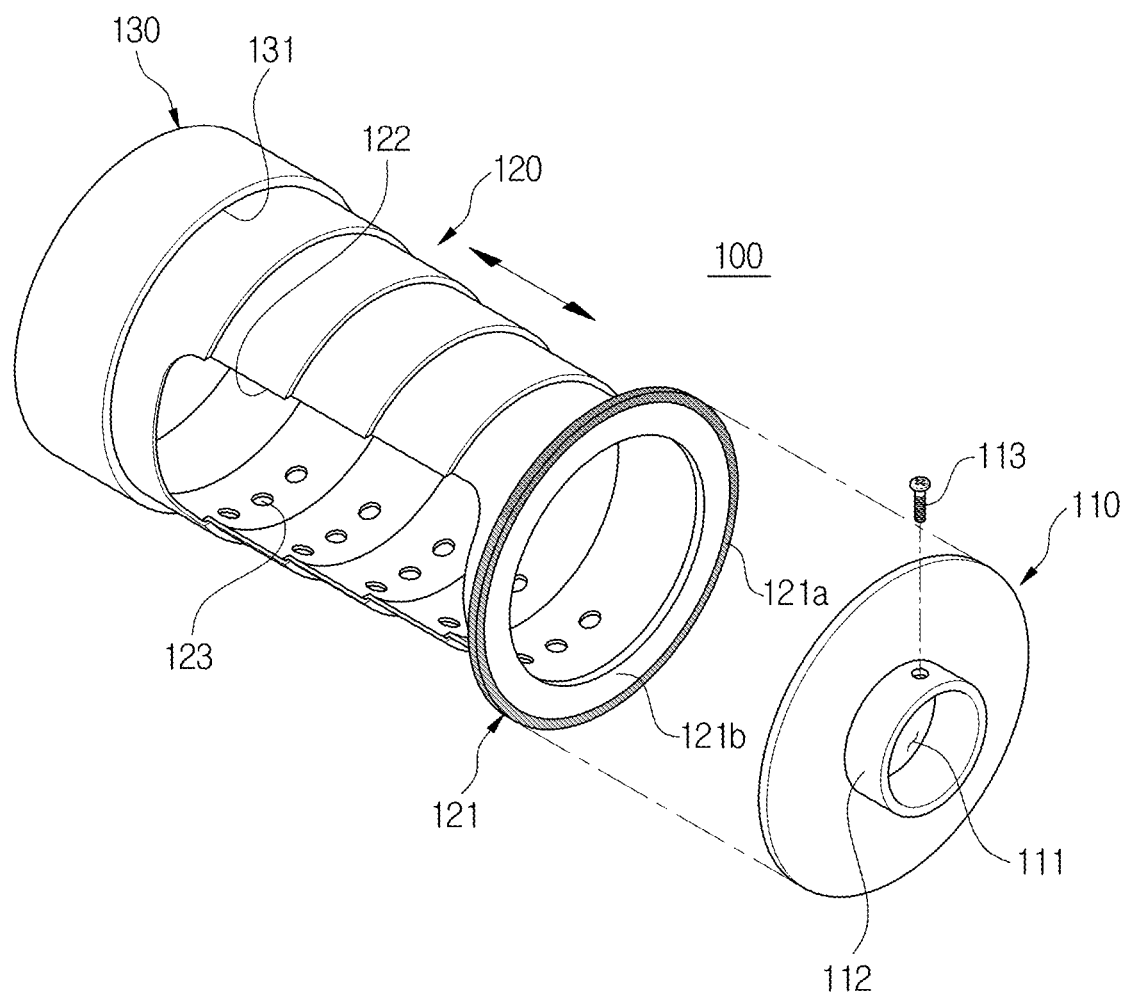
FIG. 2 is a perspective view of the handle protection device according to the various exemplary embodiments of the present invention.
Figure 3:
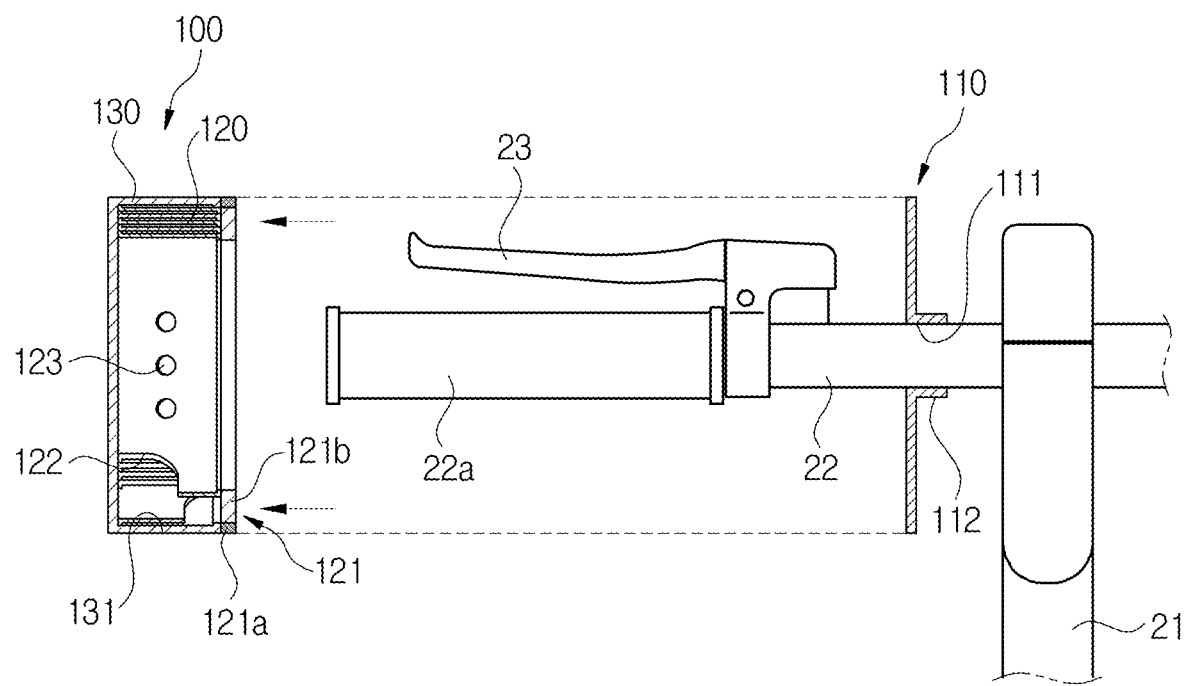
FIG. 3 illustrates a state in which a protection cover of the handle protection device according to the various exemplary embodiments of the present invention is separated from a grip portion.
Figure 4:
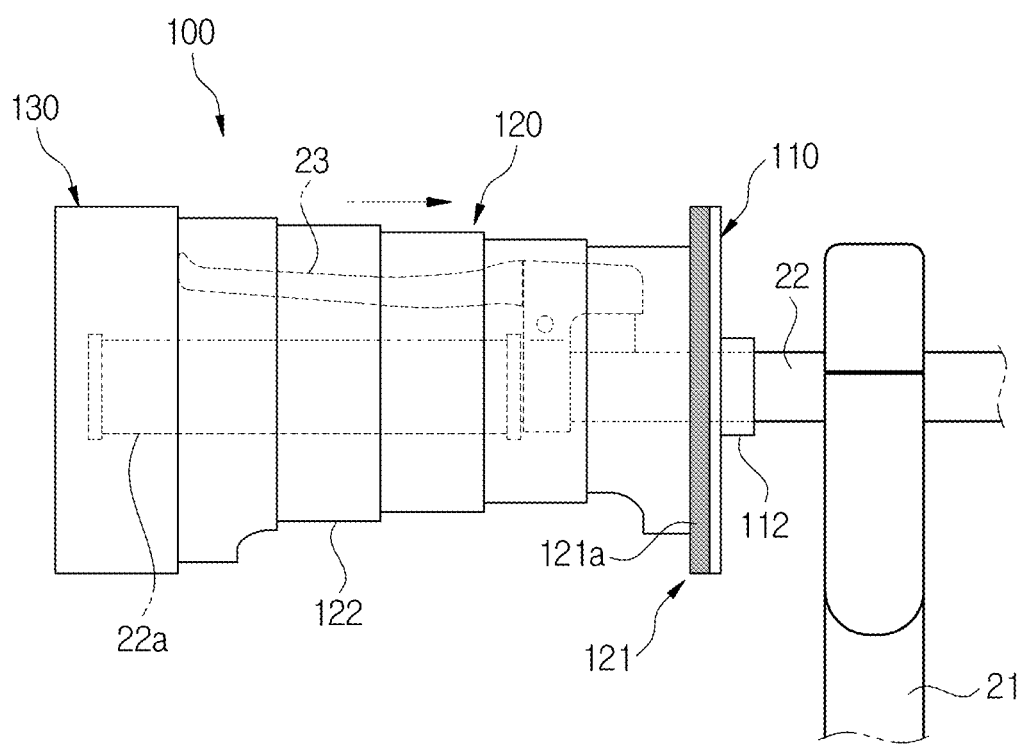
FIG. 4 illustrates a state in which the protection cover of the handle protection device according to the various exemplary embodiments of the present invention is mounted on the outside of the grip portion.

FIG. 2, FIG. 3 and FIG. 4 illustrate the handle protection device 100 according to the various exemplary embodiments of the present invention. As illustrated in FIG. 2, FIG. 3 and FIG. 4, the handle protection device 100 of the various exemplary embodiments may include a first protection member 110, a protection cover 120, and a second protection member 130.

As illustrated in FIG. 2, the first protection member 110 may be made of a metal material to which a magnet may be attached and may be formed in a disk shape or a short cylindrical shape with a closed side thereof. The first protection member 110 may include a coupling hole 111 formed in a size through which the grip portion 22a may pass on a center portion thereof to be coupled to an external surface of the handle member 22, a support portion 112 extending in a cylindrical shape in one side direction from the coupling hole 111, and a fixing screw 113 fastened to the support portion 112 to couple the support portion 112 to the handle member 22.

The first protection member 110 may be provided to have a radius greater than a height at which components protrude from the grip portion 22a so that the first protection member 110 may protect the components such as the brake lever 23 and the operation member even when the personal mobility falls downwards.

The first protection member 110 may be fixed by fastening the fixing screw 113 in a state of being fitted to the external surface of the handle member 22 between the grip portion 22a and the steering shaft 21 before the brake lever 23 is provided.

The protection cover 120 may be formed in a cylindrical shape having a size configured for enclosing and accommodating the grip portion 22a of the handle member 22, the brake lever 23 provided on the grip portion 22a, and a hand of the user. The protection cover 120 includes a coupling end portion 121 detachably coupled to the first protection member 110, and an opening 122 formed on a circumferential side to allow a hand of the user to enter and exit.

The second protection member 130 is fixed to the other end portion of the protection cover 120 opposite to the coupling end portion 121. Like the first protection member 110, the second protection member 130 may also be made of a metal material to which a magnet may be attached and may be formed in a disk shape or a short cylindrical shape with a closed side thereof. A size of the second protection member 130 may be the same as or slightly greater than that of the first protection member 110.

Because the protection cover 120 is detachably coupled to the first protection member 110, the protection cover 120 may be easily separated from the handle member 22 together with the second protection member 130. The protection cover 120 may be provided in a cylindrical telescopic type in which the protection cover 120 is folded toward the second protection member 130 to be shortened or unfolded from the second protection member 130 to be lengthened. As illustrated in FIG. 3, the second protection member 120 is provided with an accommodating groove 131 for accommodating a portion of the protection cover 120 when the protection cover 120 is folded. Therefore, when the protection cover 120 is to be separated and stored, the protection cover 120 may be folded and shortened by being pushed toward the second protection member 130.

The coupling end portion 121 of the protection cover 120 may include a magnet ring 121a configured for being attached to the first protection member 110 or the second protection member 130, and a metal support ring 121b for supporting an internal surface of the magnet ring 121a. Therefore, as illustrated in FIG. 3, when the protection cover 120 is separated and folded, the magnet ring 121a may be attached to an edge portion of the second protection member 130, and as illustrated in FIG. 4, when the protection cover 120 is mounted by being unfolded in a cylindrical shape, the magnet ring 121a may be attached to an edge portion of the first protection member 110.

Referring to FIG. 2, the protection cover 120 is provided with one or more drain holes 123 formed on a lower side thereof so that rainwater introduced therein or the like may be drained.

The handle protection device 100 of the various exemplary embodiments may safely protect the components mounted on the handle member 22 even when the personal mobility falls down because the first protection member 110, the protection cover 120, and the second protection member 130 accommodate and protect the components mounted on the handle member 22.

The handle protection device 100 of the various exemplary embodiments may protect a hand of the user hand from injury or cold outside air because the protection cover 120 encloses and protects the outside of the hand of the user.

The handle protection device 100 of the various exemplary embodiments are convenient to store because the protection cover 120 may be folded to be shortened by being pushed toward the second protection member 130 when the protection cover 120 is to be separated from the handle member 22.

Figure 5:
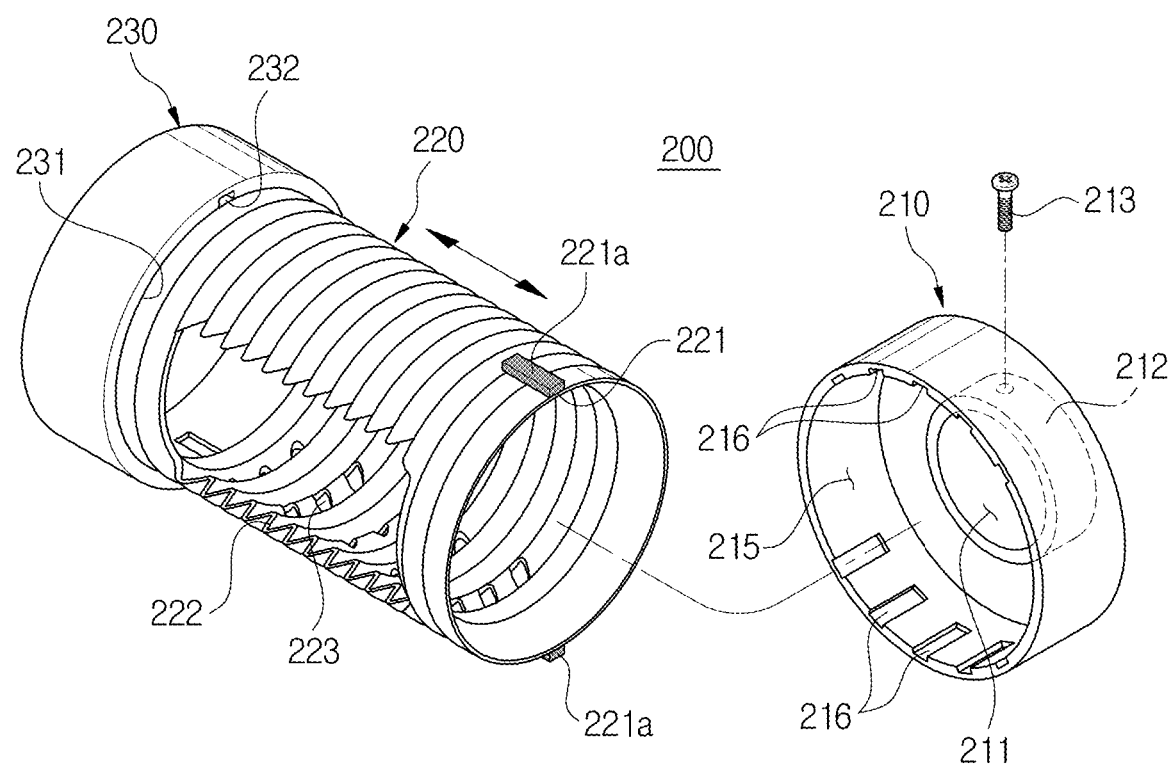
FIG. 5 is a perspective view of a handle protection device according to various exemplary embodiments of the present invention.

FIGS. 5 to 10 illustrate a handle protection device 200 according to various exemplary embodiments of the present invention. As illustrated in FIG. 5, the handle protection device 200 of the various exemplary embodiments includes a first protection member 210, a protection cover 220, and a second protection member 230.

In the various exemplary embodiments of the present invention, the, the protection cover 220 is provided in a cylindrical corrugated tube type in which the protection cover 220 is folded toward the second protection member 230 to be shortened or unfolded from the second protection member 230 to be lengthened. The protection cover 220 of the various exemplary embodiments are also formed in a cylindrical shape having a size configured for enclosing and accommodating the grip portion 22a, the components provided on the grip portion 22a, and a hand of the user.

The protection cover 220 includes a coupling end portion 221 detachably coupled to the first protection member 210, an opening 222 to allow a hand of the user to enter and exit, and one or more drain holes 223 provided on a lower side thereof.

The coupling end portion 221 of the protection cover 220 is provided with a plurality of magnet protrusions 221a protruding toward an external surface of the protection cover 220 to be attached to the first protection member 210.

The first protection member 210 is made of a metal material to which a magnet may be attached and may be formed in a short cylindrical shape with a closed side thereof. The first protection member 210 may include a coupling hole 211 formed in a size through which the grip portion 22a may pass on a center portion thereof to be coupled to the external surface of the handle member 22, a support portion 212 extending in a cylindrical shape in one side direction from the coupling hole 211, and a fixing screw 213 fastened to the support portion 212 to couple the support portion 212 to the handle member 22. The first protection member 210 may be fixed by fastening the fixing screw 213 in a state of being fitted to the external surface of the handle member 22 between the grip portion 22a and the steering shaft 21 before the brake lever 23 is provided.

The first protection member 210 may be provided to have a radius greater than a height at which components protrude from the grip portion 22a so that the first protection member 210 may protect the components such as the brake lever 23 and the like even when the personal mobility falls down.

The first protection member 210 includes a first accommodating groove 215 for accommodating the coupling end portion 221 of the protection cover 220, and a plurality of first coupling grooves 216 formed on an internal surface of a circumference of the first accommodating groove 215 so that the magnet protrusions 221a of the protection cover 220 may be correspondingly coupled thereto.

The plurality of first coupling grooves 216 is formed in a number greater than a number of the magnet protrusions 221a to change a coupling position of the protection cover 220 by rotating the protection cover 220 as needed, and disposed at intervals in a circumferential direction of the internal surface. Therefore, the user may rotate the protection cover 220 when a position of the opening 222 is not appropriate.

The second protection member 230 is fixed to the other end portion of the protection cover 220 opposite to the coupling end portion 221. Like the first protection member 210, the second protection member 230 may also be made of a metal material to which a magnet may be attached and may be formed in a short cylindrical shape with a closed side thereof. A size of the second protection member 230 may be the same as or slightly greater than that of the first protection member 210.

Figure 6:
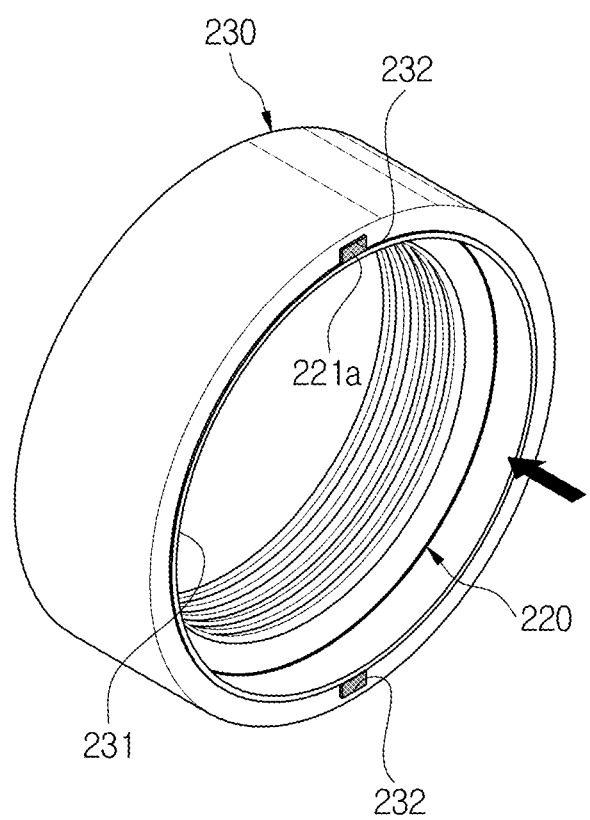
FIG. 6 illustrates a state in which a protection cover of the handle protection device according to the various exemplary embodiments of the present invention is accommodated in a second protection member.

The second protection member 230 includes a second accommodating groove 231 for accommodating the protection cover 220 in a folded state, and a plurality of second coupling grooves 232 formed on an internal surface of a circumference of the second accommodating groove 231 so that the plurality of magnet protrusions 221a may be correspondingly coupled thereto in the state in which the protection cover 220 is folded. Therefore, as illustrated in FIG. 6, the second protection member 230 may accommodate the protection cover 220 in a folded state.

Figure 7:
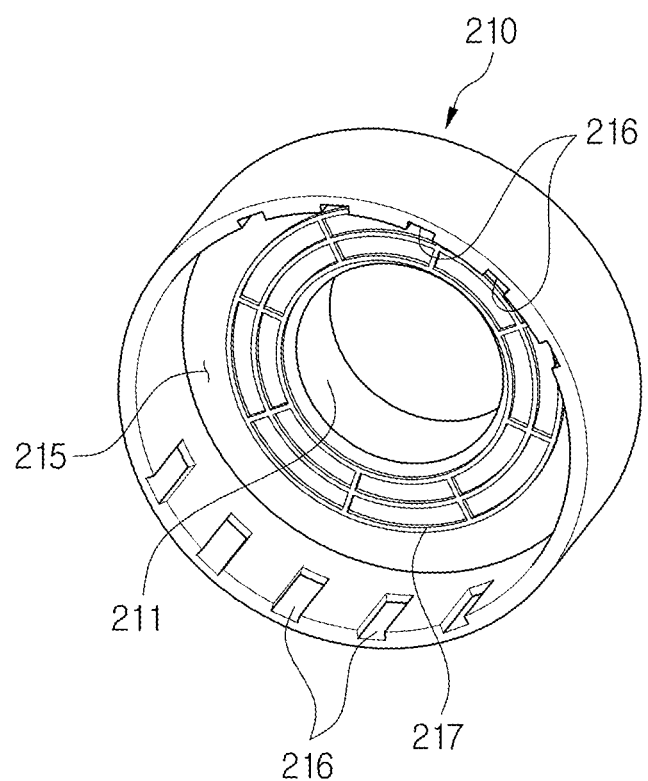
FIG. 7 and FIG. 8 illustrate modified examples of a first protection member of the handle protection device according to the various exemplary embodiments of the present invention.
Figure 8:
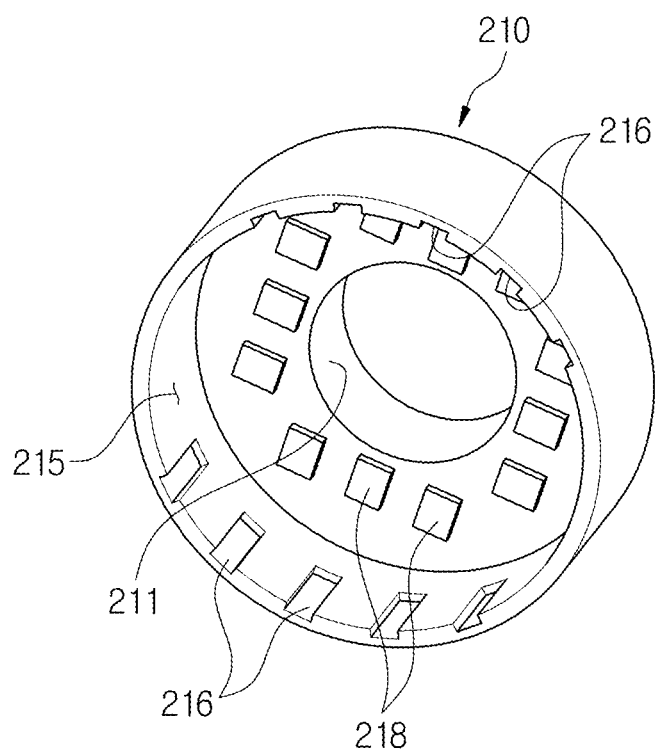

On an internal surface of the first protection member 210, a heater 217 may be provided to heat an internal space of the protection cover 220 as illustrated in FIG. 7, or at least a sterilization lamp 218 may be provided to sterilize the internal space of the protection cover 220 as illustrated in FIG. 8.

Figure 9:
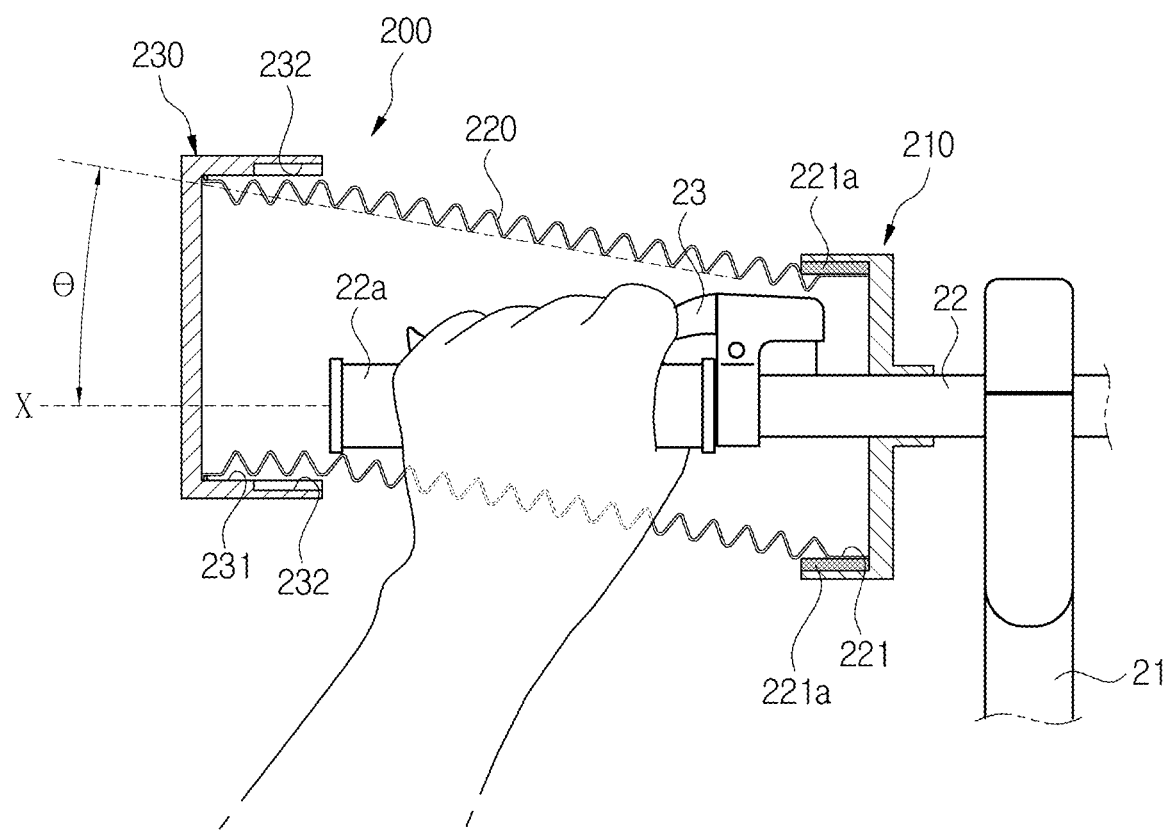
FIG. 9 illustrates a modified example of the protection cover of the handle protection device according to the various exemplary embodiments of the present invention.

Referring to FIG. 9, the protection cover 220 may be provided such that an external surface thereof is inclined at a predetermined angle θ with respect to the axis x of the grip portion 22a, so that in a state in which the protection cover 220 is mounted on the outside of the grip portion 22a of the handle member 22, an end portion of the protection cover 220 coupled to the second protection member 230 is located in front of the coupling end portion 221. That is, the protection cover 220 may be inclined in an asymmetric state in front and rear sides. The protection cover 220 as described above is convenient to use because a hand of the user may smoothly enter an inside thereof.

Figure 10:
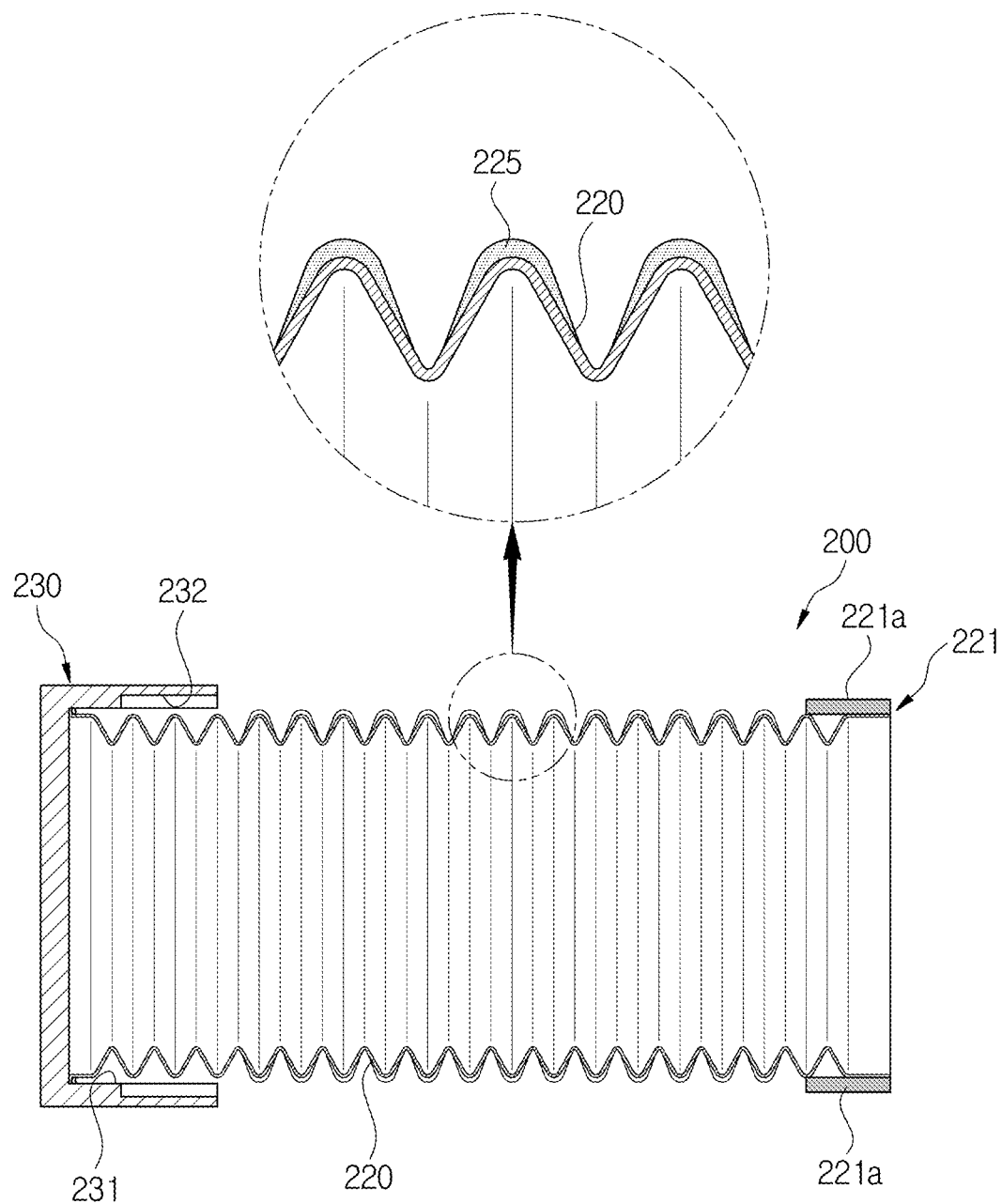
FIG. 10 illustrates a reinforcing coating layer provided on the outside of the protection cover of the handle protection device according to the various exemplary embodiments of the present invention.

Referring to FIG. 10, the protection cover 220 may include reinforcing coating layers 225 to reinforce peak portions of an external surface thereof. The reinforcing coating layers 225 may be made of a material stronger than a material of the protection cover 220. Because the reinforcing coating layers 225 are provided only at the peak portions, the overall rigidity of the protection cover 220 may be improved while facilitating the smooth folding of the protection cover 220. The reinforcing coating layers 225 may reduce a damage of the protection cover 220 from external impact, and may also reduce a phenomenon of the protection cover 220 swaying due to wind or the like.

The handle protection device 200 of the various exemplary embodiments may also safely protect the components mounted on the handle member 22 even when the personal mobility falls down because the first protection member 210, the protection cover 220, and the second protection member 230 accommodate and protect the components mounted on the handle member 22, and may protect a hand of the user hand from injury or cold outside air because the protection cover 220 encloses and protects the outside of the hand of the user.

The handle protection device 200 of the various exemplary embodiments are convenient to store because the protection cover 220 may be folded by being pushed toward the inside of the second protection member 230 when the protection cover 220 is to be separated from the handle member 22.

As is apparent from the above, a handle protection device configured for a personal mobility according to various exemplary embodiments of the present invention can safely protect components mounted on a handle even when the personal mobility falls down because a first protection member, a protection cover, and a second protection member accommodate and protect the components mounted on the handle member.

Furthermore, the handle protection device configured for a personal mobility according to various exemplary embodiments of the present invention can protect a hand of a user from injury or cold outside air because the protection cover covers and protects the hand of the user.

Furthermore, the handle protection device configured for a personal mobility according to various exemplary embodiments of the present invention is convenient to store because when the protection cover is to be detached from the handle member, the protection cover may be folded to be shortened by being pushed toward the second protection member.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A handle protection apparatus for a personal mobility including a steering shaft and a handle member provided with a grip portion at opposite sides of the handle member, the handle protection apparatus comprising:
   a first protection member mounted on an external surface of the handle member between the grip portion and the steering shaft;
   a protection cover configured to enclose and accommodate the grip portion and at least one component provided on the grip portion and including:
   a coupling end portion at a first end portion of the protection cover and detachably coupled to the first protection member; and
   an opening for a hand of a user to enter or exit through the opening; and
   a second protection member fixed to a second end portion of the protection cover opposite to the coupling end portion,
   wherein the first protection member and the second protection member are in a shape of a disk or a cylinder having a radius greater than a maximum height at which the at least one component protrudes from the grip portion.

2. The handle protection apparatus of claim 1, wherein the first protection member and the second protection member are made of a metal material to which a magnet is attachable.

3. The handle protection apparatus of claim 2, wherein the protection cover is provided to be telescopically extendable so that the protection cover is foldable toward the second protection member to be shortened in length or unfoldable from the second protection member to be lengthened in the length.

4. The handle protection apparatus of claim 3, wherein the coupling end portion includes a plurality of magnet projections protruding toward an external surface of the protection cover.

5. The handle protection apparatus of claim 4, wherein the first protection member includes a first accommodating groove to accommodate the coupling end portion and a plurality of first coupling grooves formed on an internal surface of a circumference of the first accommodating groove so that the plurality of magnet protrusions is correspondingly coupled thereto, and wherein the second protection member includes a second accommodating groove to accommodate the protection cover in a folded state of the protection cover and a plurality of second coupling; grooves formed on an internal surface of a circumference of the second accommodating groove so that the plurality of magnet protrusions is correspondingly coupled to the plurality of second coupling grooves when the protection cover is folded.

6. The handle protection apparatus of claim 5, wherein the plurality of first coupling grooves is formed in a number greater than a number of the plurality of magnet protrusions to change a coupling position of the protection cover.

7. The handle protection apparatus of claim 3, wherein the second protection member includes an accommodating groove to accommodate a portion of the protection cover when the protection cover is folded.

8. The handle protection apparatus of claim 3, wherein the coupling end portion includes a magnet ring selectively attachable to the first protection member or the second protection member.

9. The handle protection apparatus of claim 8, wherein the coupling end portion includes a metal support ring to support an internal surface of the magnet ring.

10. The handle protection apparatus of claim 2, wherein the protection cover is cylindrically corrugated so that the protection cover is foldable toward the second protection member to be shortened in length or unfoldable from the second protection member to be lengthened in the length.

11. The handle protection apparatus of claim 10, wherein the coupling end portion includes a plurality of magnet projections protruding toward an external surface of the protection cover.

12. The handle protection apparatus of claim 11, wherein the first protection member includes a first accommodating groove to accommodate the coupling end portion and a plurality of first coupling grooves formed on an internal surface of a circumference of the first accommodating groove so that the plurality of magnet protrusions is correspondingly coupled thereto, and wherein the second protection member includes a second accommodating groove to accommodate the protection cover in a folded state of the protection cover and a plurality of second coupling grooves formed on an internal surface of a circumference of the second accommodating groove so that the plurality of magnet protrusions is correspondingly coupled to the plurality of second coupling grooves when the protection cover is folded.

13. The handle protection apparatus of claim 12, wherein the plurality of first coupling grooves is formed in a number greater than a number of the plurality of magnet protrusions to change a coupling position of the protection cover.

14. The handle protection apparatus of claim 10, wherein the protection cover includes reinforcing coating layers to reinforce peak portions of an external surface of the protection cover.

15. The handle protection apparatus of claim 10, wherein an external surface of the protection cover is inclined with respect to an axis of the grip portion so that an end portion of the protection cover coupled to the second protection member is located further away from the grip portion than the coupling end portion.

16. The handle protection apparatus of claim 1, wherein the protection cover includes one or more drain holes formed on a lower side thereof.

17. The handle protection apparatus of claim 1, further including
a heater provided in the first protection member to heat an internal space of the protection cover.

18. The handle protection apparatus of claim 1, further including
at least a sterilization lamp provided in the first protection member to sterilize an internal space of the protection cover.

19. The handle protection apparatus of claim 1, wherein the first protection member includes a support portion having a coupling hole through which the grip portion is configured to pass and the support portion is fastened to the handle member by a fixing member.

* * * * *